(12) United States Patent
Hart et al.

(10) Patent No.: US 7,388,906 B2
(45) Date of Patent: Jun. 17, 2008

(54) METHOD FOR DETECTING BRIDGED TAPS ON TELEPHONY CABLE

(75) Inventors: Richard Dennis Hart, San Ramon, CA (US); Raghvendra G. Savoor, Walnut Creek, CA (US); Laurie G. King, San Jose, CA (US); George Keith Cambron, Round Rock, TX (US); Kapil Shrikhande, Berkeley, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 738 days.

(21) Appl. No.: 10/838,180

(22) Filed: May 3, 2004

(65) Prior Publication Data

US 2005/0243904 A1  Nov. 3, 2005

(51) Int. Cl.
H04B 1/38 (2006.01)

(52) U.S. Cl. .................. 375/222; 375/219; 375/224; 379/1.04

(58) Field of Classification Search ................. 375/222, 375/219, 224; 379/1.04
See application file for complete search history.

(56) References Cited

U.S. PATENT DOCUMENTS

| | | | |
|---|---|---|---|
| 5,751,338 A | 5/1998 | Ludwig, Jr. | |
| 5,974,139 A | 10/1999 | McNamara et al. | |
| 5,987,061 A | 11/1999 | Chen | |
| 6,044,107 A | 3/2000 | Gatherer et al. | |
| 6,055,268 A | 4/2000 | Timm et al. | |
| 6,081,291 A | 6/2000 | Ludwig, Jr. | |
| 6,292,559 B1 | 9/2001 | Gaikwad et al. | |
| 6,317,495 B1 | 11/2001 | Gaikwad et al. | |
| 6,424,657 B1 | 7/2002 | Voit et al. | |
| 6,466,088 B1 | 10/2002 | Rezvani et al. | |
| 6,467,092 B1 | 10/2002 | Geile et al. | |
| 6,477,238 B1 | 11/2002 | Schneider et al. | |
| 6,487,276 B1 * | 11/2002 | Rosen et al. ............... | 379/1.04 |
| 6,498,791 B2 | 12/2002 | Pickett et al. | |
| 6,507,606 B2 | 1/2003 | Shenoi et al. | |
| 6,532,277 B2 | 3/2003 | Ulanskas et al. | |

(Continued)

OTHER PUBLICATIONS

T1.413-1998 Issue 2, T1.E1.4 working group from ANSI, 1998, pp. 137-140.*

(Continued)

*Primary Examiner*—Mohammad H. Ghayour
*Assistant Examiner*—Juan A. Torres
(74) *Attorney, Agent, or Firm*—Toler Law Group, Intellectual Properties (57) ABSTRACT

In a particular embodiment a method of collecting and processing modem data is provided. The method includes, during training of a broadband modem, sending a series of tones within a frequency transmission band of the broadband modem, receiving the transmitted series of tones at a receiving broadband modem, receiving a measurement value, determining a transmission loss for each of the series of tones by comparing the predetermined transmission power level, and the received measured power level, performing a statistical match comparison between each of the received tone signals and a plurality of different computer models of a single transmission facility having various bridge taps connected to the single transmission facility, and determining a best fit between each of the received tone signals and one of the plurality of the bridge tap computer models. The series of tones have a predetermined transmission power level.

23 Claims, 9 Drawing Sheets

U.S. PATENT DOCUMENTS

| | | | |
|---|---|---|---|
| 6,538,451 B1 | 3/2003 | Galli et al. | |
| 6,549,568 B1 | 4/2003 | Bingel | |
| 6,570,855 B1 | 5/2003 | Kung et al. | |
| 6,597,689 B1 | 7/2003 | Chiu et al. | |
| 6,608,835 B2 | 8/2003 | Geile et al. | |
| 6,614,781 B1 | 9/2003 | Elliott et al. | |
| 6,625,255 B1 | 9/2003 | Green et al. | |
| 6,640,239 B1 | 10/2003 | Gidwani | |
| 6,643,266 B1 | 11/2003 | Pugaczewski | |
| 6,658,052 B2 | 12/2003 | Krinsky et al. | |
| 6,667,971 B1 | 12/2003 | Modarressi et al. | |
| 6,668,041 B2 | 12/2003 | Kamali et al. | |
| 6,674,725 B2 | 1/2004 | Nabkel et al. | |
| 6,674,749 B1 | 1/2004 | Mattathil | |
| 6,680,940 B1 | 1/2004 | Lewin et al. | |
| 6,697,768 B2 | 2/2004 | Jones et al. | |
| 6,700,927 B1 | 3/2004 | Esliger et al. | |
| 6,724,859 B1 | 4/2004 | Galli | |
| 6,728,238 B1 | 4/2004 | Long et al. | |
| 6,731,678 B1 | 5/2004 | White et al. | |
| 6,735,601 B1 | 5/2004 | Subrahmanyam | |
| 6,751,218 B1 | 6/2004 | Hagirahim et al. | |
| 6,751,315 B1 | 6/2004 | Liu et al. | |
| 6,751,662 B1 | 6/2004 | Natarajan et al. | |
| 6,754,283 B1 | 6/2004 | Li | |
| 6,762,992 B1 | 7/2004 | Lemieux | |
| 6,763,025 B2 | 7/2004 | Leatherbury et al. | |
| 6,765,864 B1 | 7/2004 | Natarajan et al. | |
| 6,765,918 B1 | 7/2004 | Dixon et al. | |
| 6,769,000 B1 | 7/2004 | Akhtar et al. | |
| 6,769,024 B1 | 7/2004 | Natarajan et al. | |
| 6,771,673 B1 | 8/2004 | Baum et al. | |
| 6,775,232 B1 | 8/2004 | Ah Sue et al. | |
| 6,775,267 B1 | 8/2004 | Kung et al. | |
| 6,775,268 B1 | 8/2004 | Wang et al. | |
| 6,775,273 B1 | 8/2004 | Kung et al. | |
| 6,778,525 B1 | 8/2004 | Baum et al. | |
| 6,782,082 B2 | 8/2004 | Rahamim | |
| 6,819,746 B1 * | 11/2004 | Schneider et al. | 379/29.01 |
| 2001/0040918 A1 * | 11/2001 | Krinsky et al. | 375/222 |
| 2001/0043647 A1 * | 11/2001 | Belge | 375/222 |
| 2002/0114383 A1 * | 8/2002 | Belge et al. | 375/222 |
| 2004/0095921 A1 | 5/2004 | Kerpez | |
| 2005/0123027 A1 * | 6/2005 | Cioffi et al. | 375/222 |

OTHER PUBLICATIONS

International Telecommunication Union, "Series G:Transmission Systems and Media, Digital Systems and Networks. Digital Sections and Digital Line System-Access Networks. Asymetric Digital Subscriber Line (ADSL) Transceivers- 2(ADSL2)," G.992.3, ITU-T. Jul. 2002, pp. 1-127.

"T1.413 Issue 2", T1.E1.4 working group from ANSI, 1998, pp. 137-140.

International Search Report and Written Opinion of the International Searching Authority, for Application No. PCT/US05/13131, mailed Aug. 17, 2007.

* cited by examiner

METHOD FOR DETECTING BRIDGED TAPS ON TELEPHONY CABLE

FIELD OF THE DISCLOSURE

The present disclosure is generally directed to a method of detecting bridged taps.

DESCRIPTION OF THE RELATED ART

Broadband telephony services based on digital subscriber line (DSL) technology offers users high digital data rates over telephony transmission facilities. The transmission facilities connecting customer premises equipment to the network are commonly known as the "loop" and consists of two wires twisted together. The millions of loops supporting service to millions of telephony subscribers are commonly called the Outside Plant (OSP). Historically, OSP was constructed and maintained in a fashion that allowed a high probability for one or more bridged taps to exist on the typical loop. A bridged tap is a segment of cable pair attached to the loop but not in the speaking path. These bridged taps had little effect on voice services, as transmission properties of a loop in the voiceband frequency range is little affected by the presence of a tap. However, ordinary bridged taps are very detrimental to DSL performance. Efficient and effective detection of their presence and effect on DSL services is required for efficient network operation.

Accordingly, there is a need for efficient methods of detecting bridged taps.

DETAILED DESCRIPTION OF THE DRAWINGS

In a particular embodiment a method of collecting and processing modem data is provided. The method includes, during training of a broadband modem, sending a series of tones within a frequency transmission band of the broadband modem, receiving the transmitted series of tones at a receiving broadband modem, receiving a measurement value of a power level for each of the received tones in the series of tones transmitted to the receiving broadband modem, determining a transmission loss for each of the series of tones by comparing the predetermined transmission power level, and the received measured power level; performing a statistical match comparison between each of the received tone signals and a plurality of different computer models of a single transmission facility having various bridge taps connected to the single transmission facility, and determining a best fit between each of the received tone signals and one of the plurality of the bridge tap computer models. The series of tones have a predetermined transmission power level.

In accordance with a particular embodiment, a method of estimating bridged taps coupled to a communication line connected to a broadband modem device is disclosed. The method includes, during a training session of the broadband modem device, receiving a plurality of tones communicated over the communication line to the broadband modem device, the plurality of tones within a frequency reception band of the broadband modem and having a predetermined transmission power level; measuring a power level for each of the plurality of received tones; determining a transmission loss for each of the plurality of tones by comparing the predetermined transmission power level and the measured power level for each of the plurality of tones; and performing statistical match comparisons between each of the plurality of received tones and a plurality of computer models. Each of the plurality of computer models represents electrical transmission properties of a single transmission facility coupled to at least one bridged tap.

Figure 1:
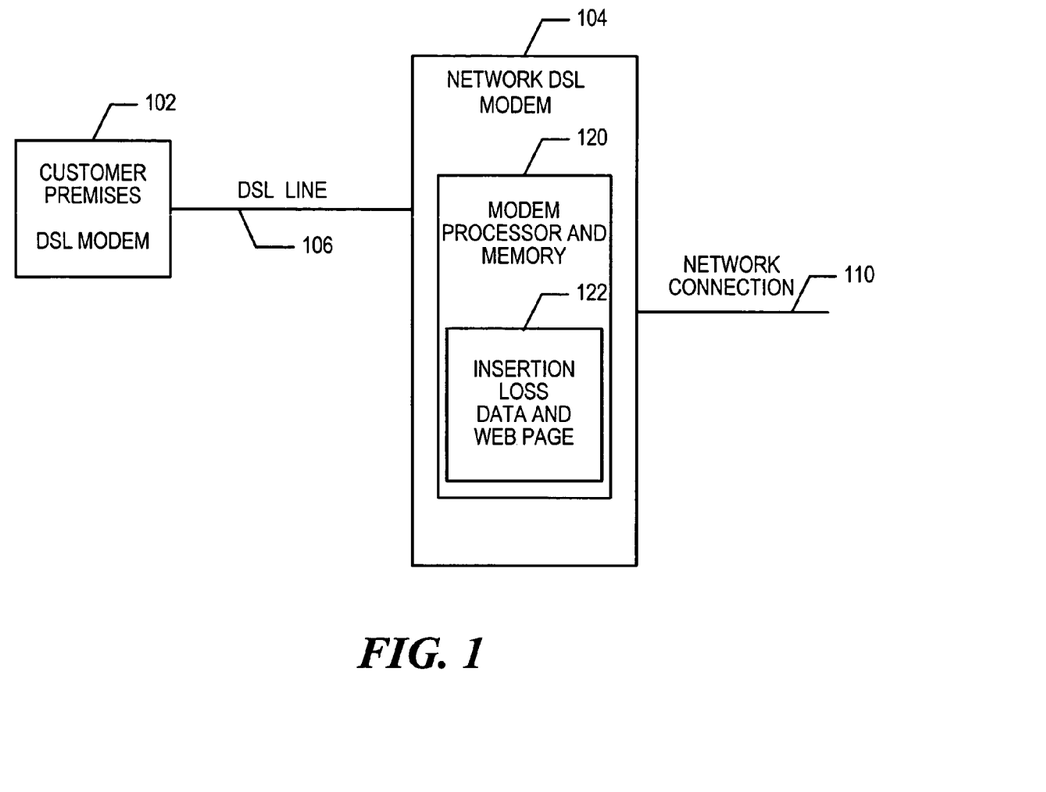
FIG. 1 is a block diagram of a system having a digital subscriber line (DSL) modem.

In another embodiment a data communication system is provided. The data communication system includes a memory including logic to estimate bridged taps coupled to a communication line that is coupled to an input of the data communication modem. The logic includes a data receiving module configured to capture data corresponding to a plurality of tones communicated over the transmission facility during a modem training session, a measurement module to capture measurement data related to a measured power level for each of the plurality of received tones, an insertion loss routine to determine a transmission loss for each of the plurality of tones by comparing the predetermined transmission power level and the measurement data for each of the plurality of tones, and statistical matching logic configured to perform statistical match comparisons between the captured data corresponding to each of the received tone signals and a plurality of computer models. Each of the plurality of computer models represents electrical transmission properties of a single transmission facility coupled to at least one bridged tap. The plurality of tones within a frequency reception band of the data communication modem, each of the plurality of tones having a predetermined transmission power level, Referring to FIG. 1, a system that includes customer premises equipment and network equipment is illustrated. The system includes customer premises equipment such as a DSL modem 102 and network equipment such as a network DSL modem 104. The customer premises DSL modem 102 is coupled remotely to the network based DSL modem 104 via the DSL facility 106. The network DSL modem 104 includes a modem processor and memory 120 which includes insertion loss data and a web page 122 to provide such insertion loss data externally. The network DSL modem 104 has a connection to a network, such as the Internet via network connection 110.

Figure 2:
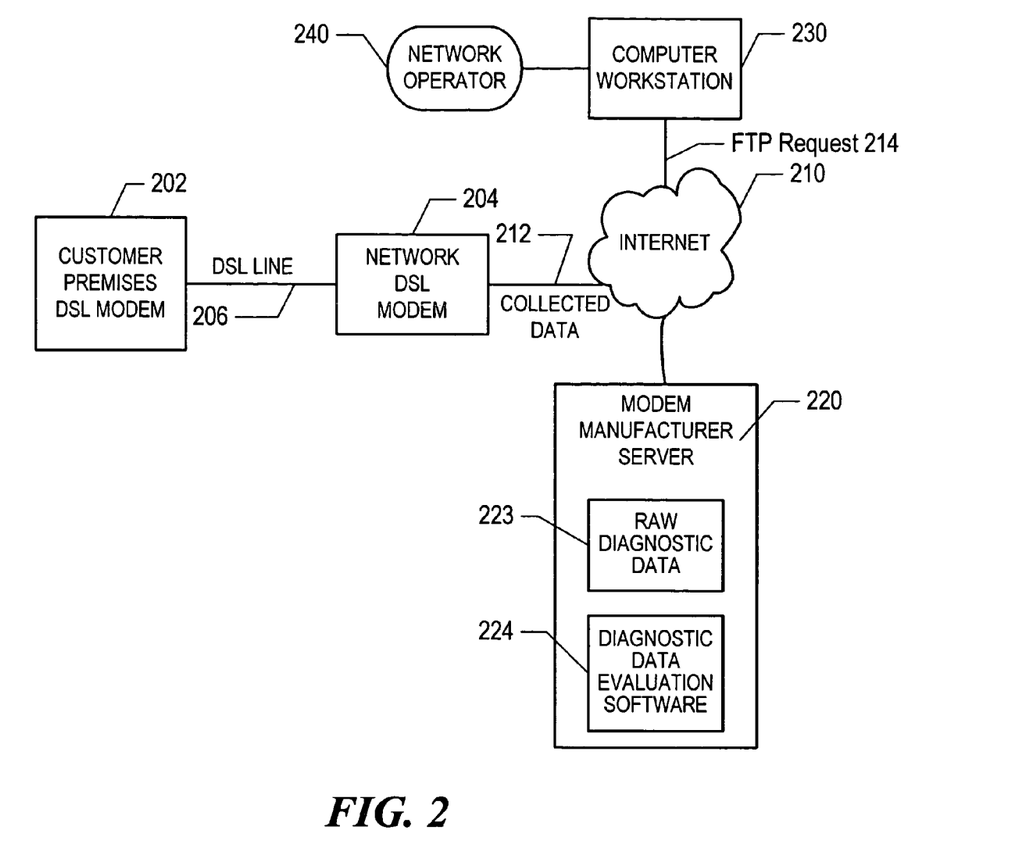
FIG. 2 is a block diagram of another system having a DSL modem.

Referring to FIG. 2, another particular embodiment of a system including customer premises equipment and network equipment for DSL is illustrated. The system includes customer premises DSL modem 202 coupled via DSL line 206 to the network DSL modem 204. The network DSL modem 204 is coupled via data connection 212 to internet 210. Connected to the internet 210 is a server 220. The server 220 may be supported and operated by a modem manufacturer, such as a manufacturer of DSL modems 202 and 204. The server 220 includes raw diagnostic data 223 and includes diagnostic data evaluation software 224. The system also includes a computer workstation 230 which is coupled to the internet 210. The computer work station 230 may be used by a network operator or technician 240.

During operation, and during a training session of the DSL modems, such as modem 202, performance and diagnostics data related to the training session is collected and stored within the network DSL modem 204. The network DSL modem 204 passes the DSL performance data 212 and communicates this data over the internet and the data is stored on a server, such as the indicated raw diagnostic data 223 stored within the server 220.

Within the server environment, the diagnostic data evaluation software 224 processes the raw diagnostic data 223 to produce analyzed diagnostic data. The computer work station 230 in response to a request from network operator 240 may issue a file transfer protocol (FTP) request 214. The file transfer protocol (FTP) request 214 is received via the internet 210 and relayed to the server 220. In response to the FTP request 214 the diagnostic data evaluation software 224 communicates the analyzed diagnostic data relating to the DSL modem performance and sends an FTP file containing the requested DSL performance data to the computer workstation 230. The network operator 240 may then issue commands at the workstation 230 to further analyze and evaluate the processed DSL data.

Figure 3:
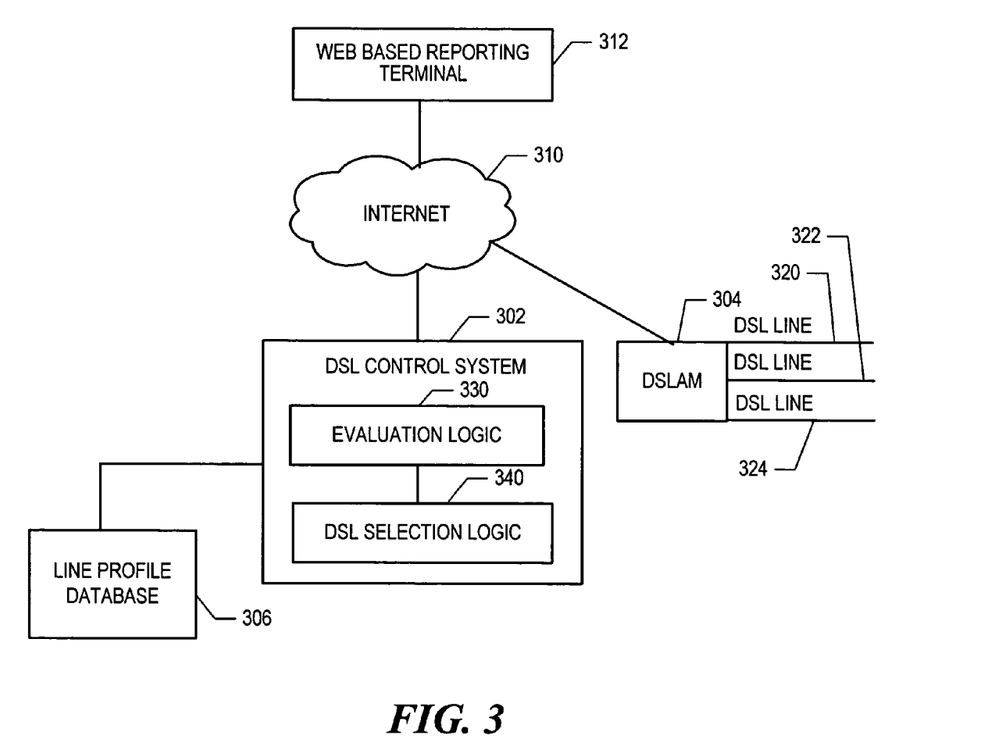
FIG. 3 is a block diagram of another system including a DSL control system.

Referring to FIG. 3, a system in accordance with another embodiment of the present invention is illustrated. The system includes a digital subscriber line (DSL) control system 302, an internet network core 310, and a digital subscriber line access multiplexor (DSLAM) 304. The system also includes a line profile database 306 coupled to the DSL control system 302. In addition, the system includes a remote web-based reporting terminal 312 coupled to the internet 310. The DSLAM 304 is connected to the internet 310 and connects to a plurality of DSL transmission facilities such as representative transmission facilities 320, 322, 324. The DSL control system 302 includes evaluation logic 330 and DSL line selection logic 340.

The DSL control system 302 may be implemented as a computer system that includes software to execute the evaluation logic 330 and the DSL selection logic 340. The DSL control system software includes logic to collect, store, and process DSL performance data for DSL modems corresponding to the DSL transmission facilities supported by DSLAM 304. The web-based reporting terminal 312 may be a computer workstation, or personal computer with a display device that includes an input device and a computer processor. An example is a computer workstation that may be operated by a user for viewing reports as to DSL network performance and statistics. The DSL profile database 306 may be implemented with standard computer database technology.

Figure 4:
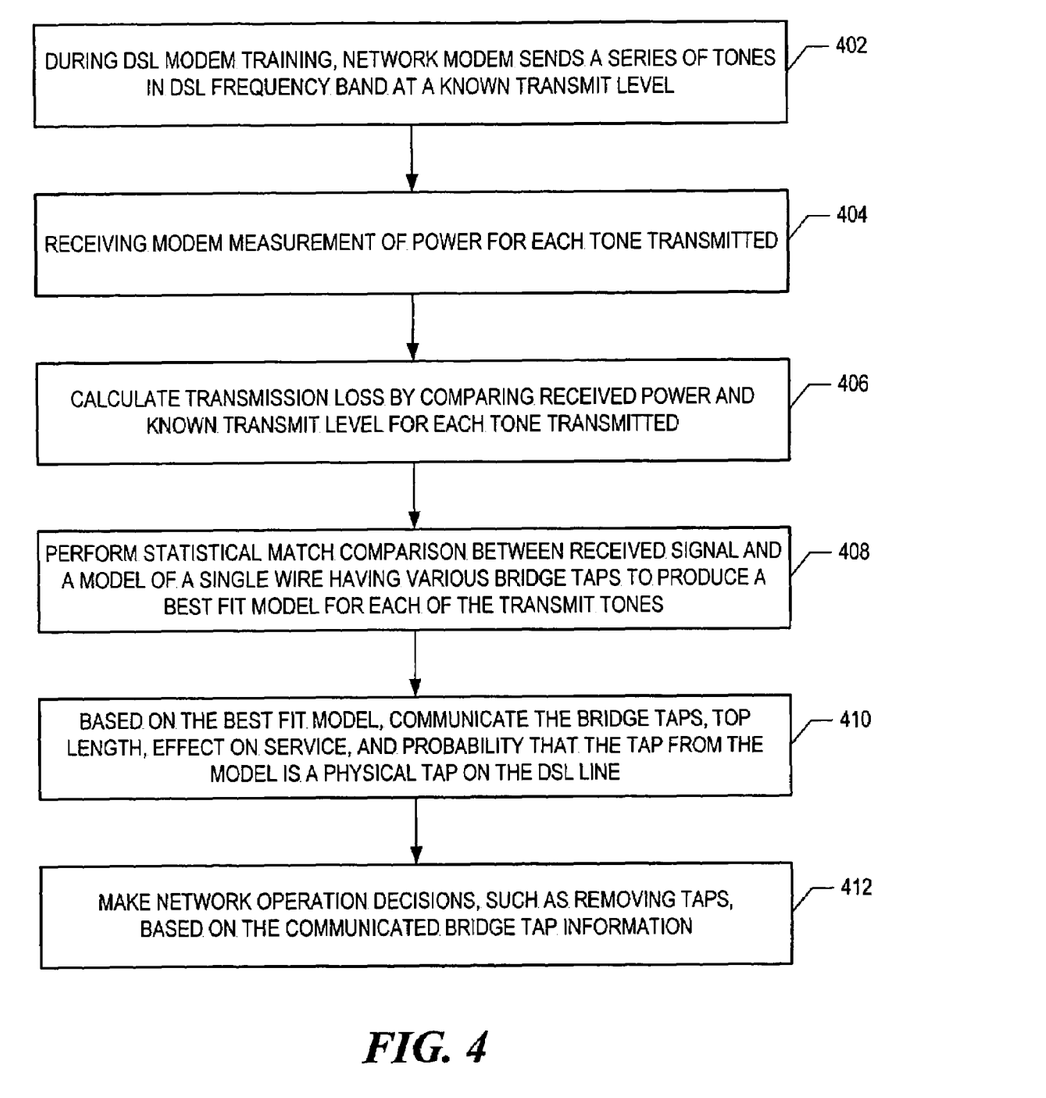
FIG. 4 is a flow chart that illustrates a method of detecting bridged tap information.

Referring to FIG. 4, a method of operation with respect to systems including DSL modems is shown. During DSL modem training, a network modem (such as found within a telephone central office) sends a series of tones having frequencies in the DSL frequency band at a known transmission level, as shown at 402. Modem measurements of power for each of the transmitted tones is received, at 404. A transmission loss is calculated by comparing the received power of each of the transmitted tones to a known transmit level for each of the transmitted tones, at 406. A statistical match comparison operation then is performed by comparing the received signal to computer models of a single wire having different bridged taps to produce a best fit model for each of the transmitted tones, at 408.

For example, the transmission loss for a particular frequency is compared to a similar frequency loss that would occur with a single wire having a single bridged tap of a predetermined length attached thereto. In the event that a first evaluated computer model does not correspond to the calculated insertion loss, a second computer model of a single wire with a different bridged tap or multiple bridged taps or the position of the tap may then be evaluated and compared on a best fit basis. This process may be continued for a variety of computer models based on various configurations of bridged taps connected to the twisted pair loop to identify a best fit model for the received signal at the particular frequency level. Based on the best fit model, the particular detected bridged tap from the computer model is communicated as well as the tap length, effect on communication service, and the probability that the bridged tap from the model represents a physical tap on the DSL line, as shown at 410.

For example, a single bridged tap may be predicted by the computer model that has a bridged tap length of a thousand feet and a predicted significant effect on service, and an estimated probability of the model being accurate. This information may be communicated to a computer work station for viewing by a network operator. The network operator upon learning of the computer model estimated bridged tap information may make a determination as to whether to remove the physical bridged tap or to leave the bridged tap if the effect on service or probability of the bridge tap corresponding to a physical bridge tap is within service performance objectives. Referring to step 412, network operation decisions are then made such as removing taps based on the communicated bridged tap information. As an example, in some situations a bridged tap does not have a significant impact on communication service so that a network operator may make a decision to not remove the bridge tap(s). However, when the insertion loss model indicates the bridged tap has a high degree of impact on communication service of the supporting DSL facility, then in this situation, the network operator may initiate a decision to remove the physical bridged tap(s) on the DSL facility.

Figure 5:
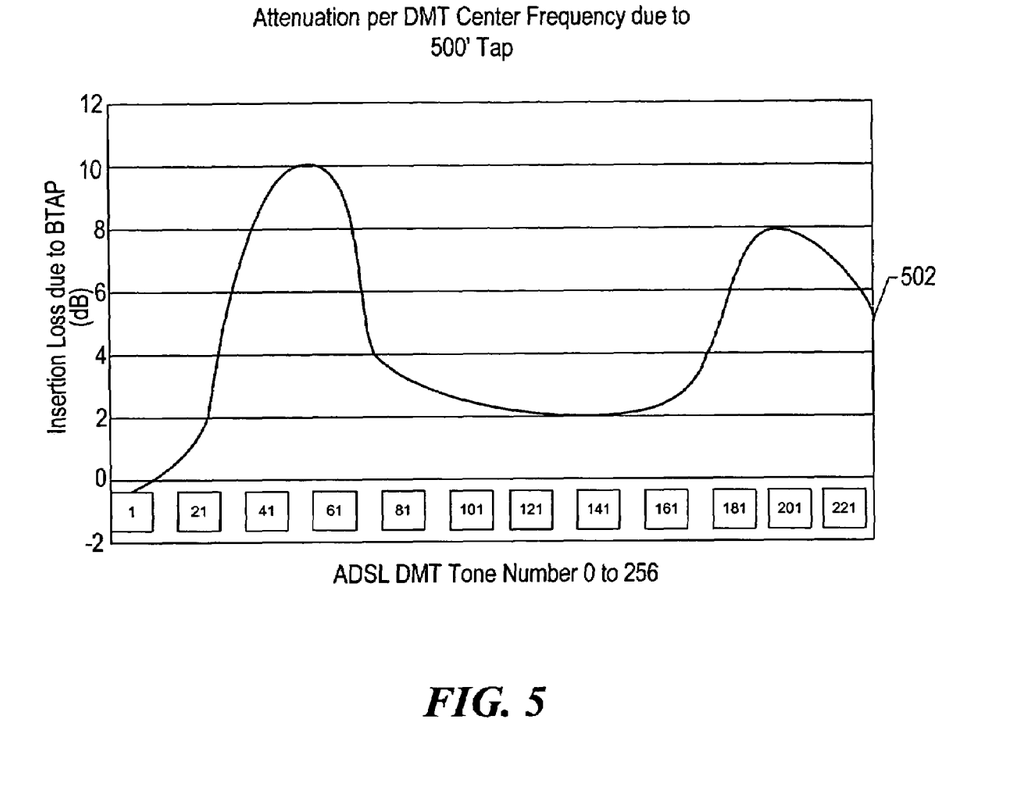
FIGS. 5-9 are general diagrams that illustrate insertion loss vs. frequency data.

Referring to FIG. 5, an example of a graph 502 illustrating bridged tap insertion loss for a 500 foot tap at various frequency tones is shown. The attenuation graph shown corresponds to DSL DMT tones varying number from 0 to 256 and provides the range of frequencies used for digital subscriber line (DSL) communication.

Figure 6:
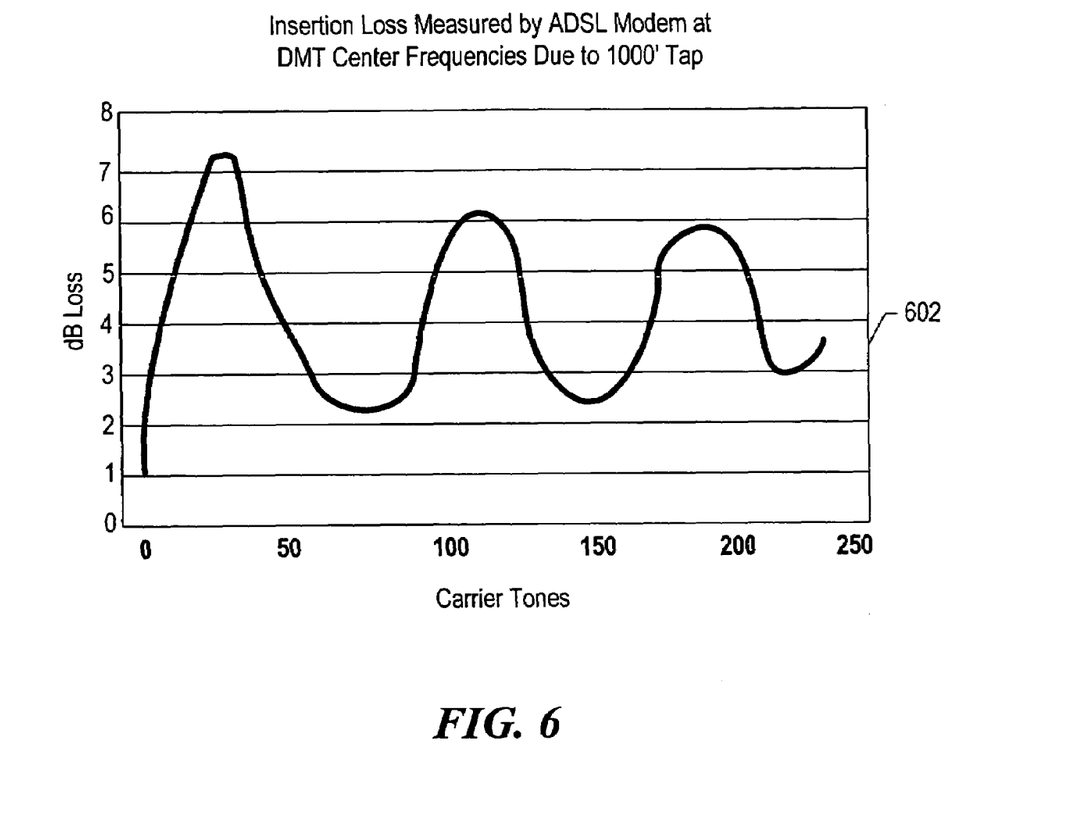
Figure 7:
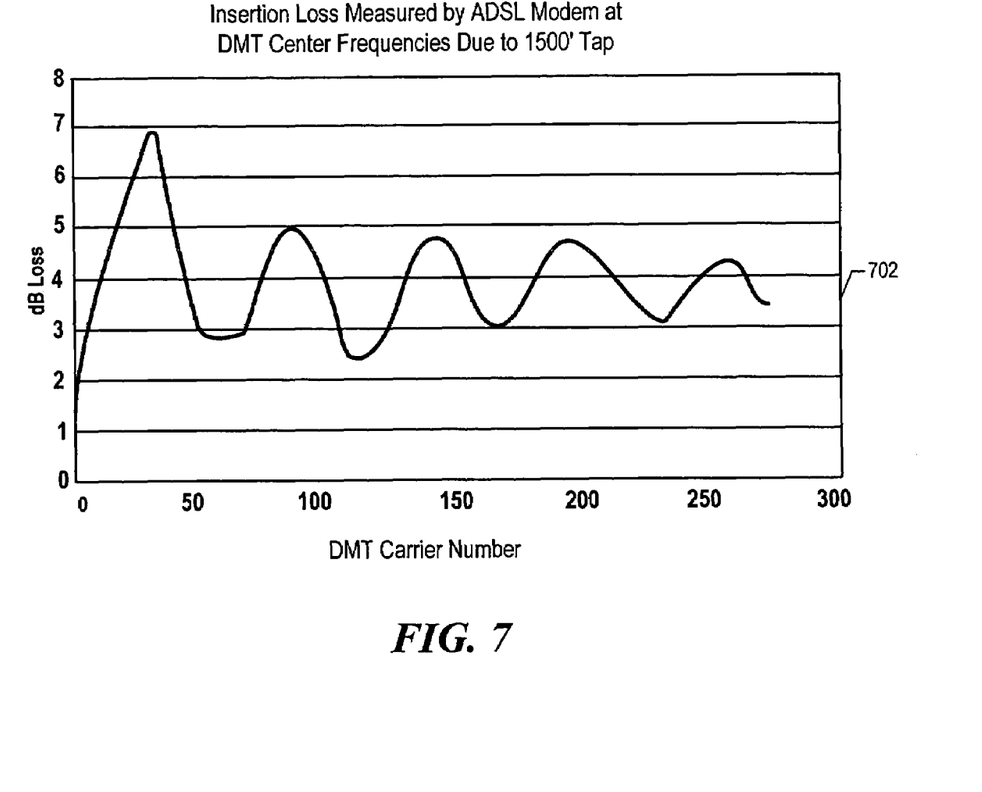
Figure 8:
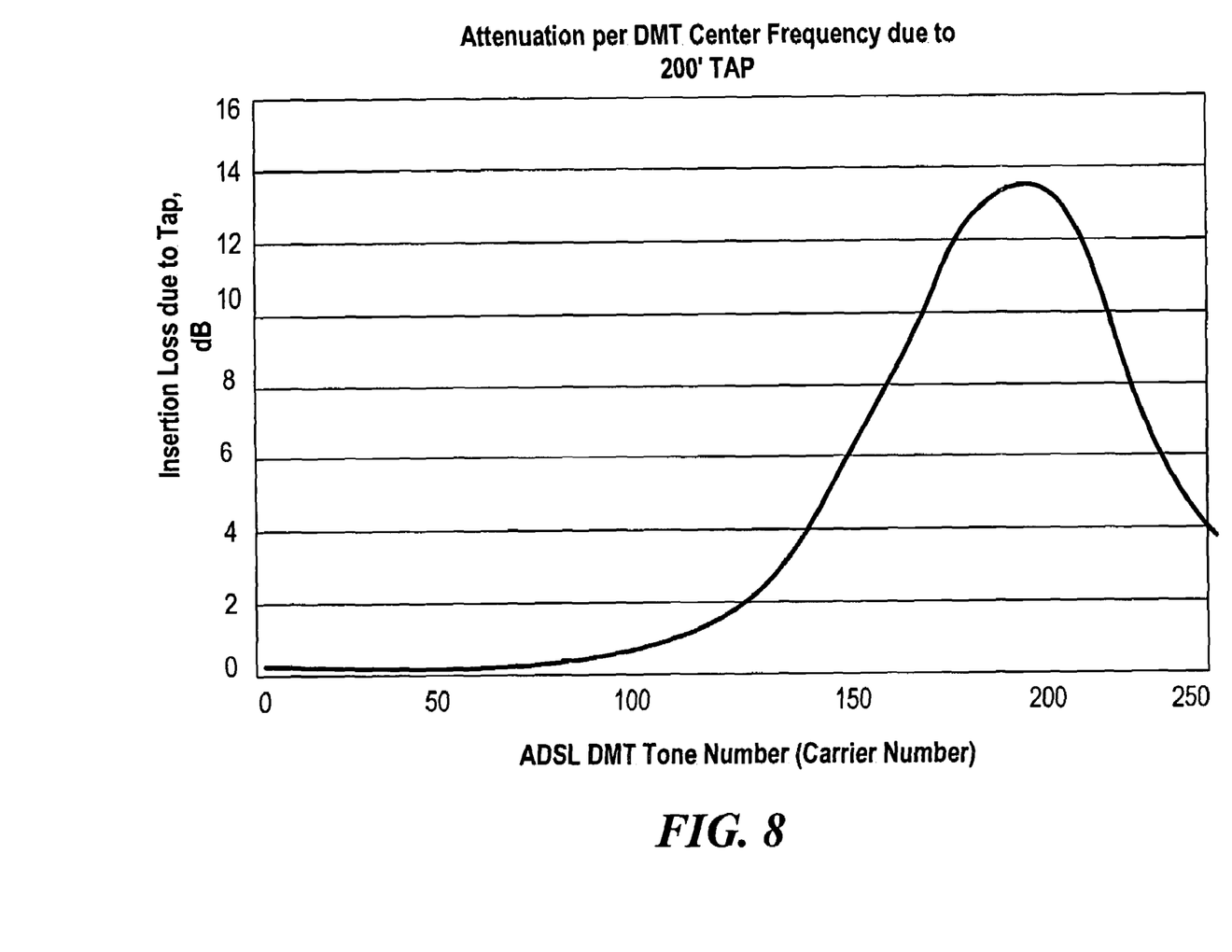

Referring to FIG. 6, the insertion loss graph 602 for a 1000 foot tap is shown. The graph 602 illustrates insertion loss for a range of discrete multi-tone (DMT) carrier numbers. The illustrated insertion loss graph 702 of FIG. 7 shows a 1500 foot tap and the graph of FIG. 8 illustrates a 200 foot tap. Thus, the disclosed method provides useful budged tap information relating to DSL performance that may be communicated to a network operator.

Figure 9:
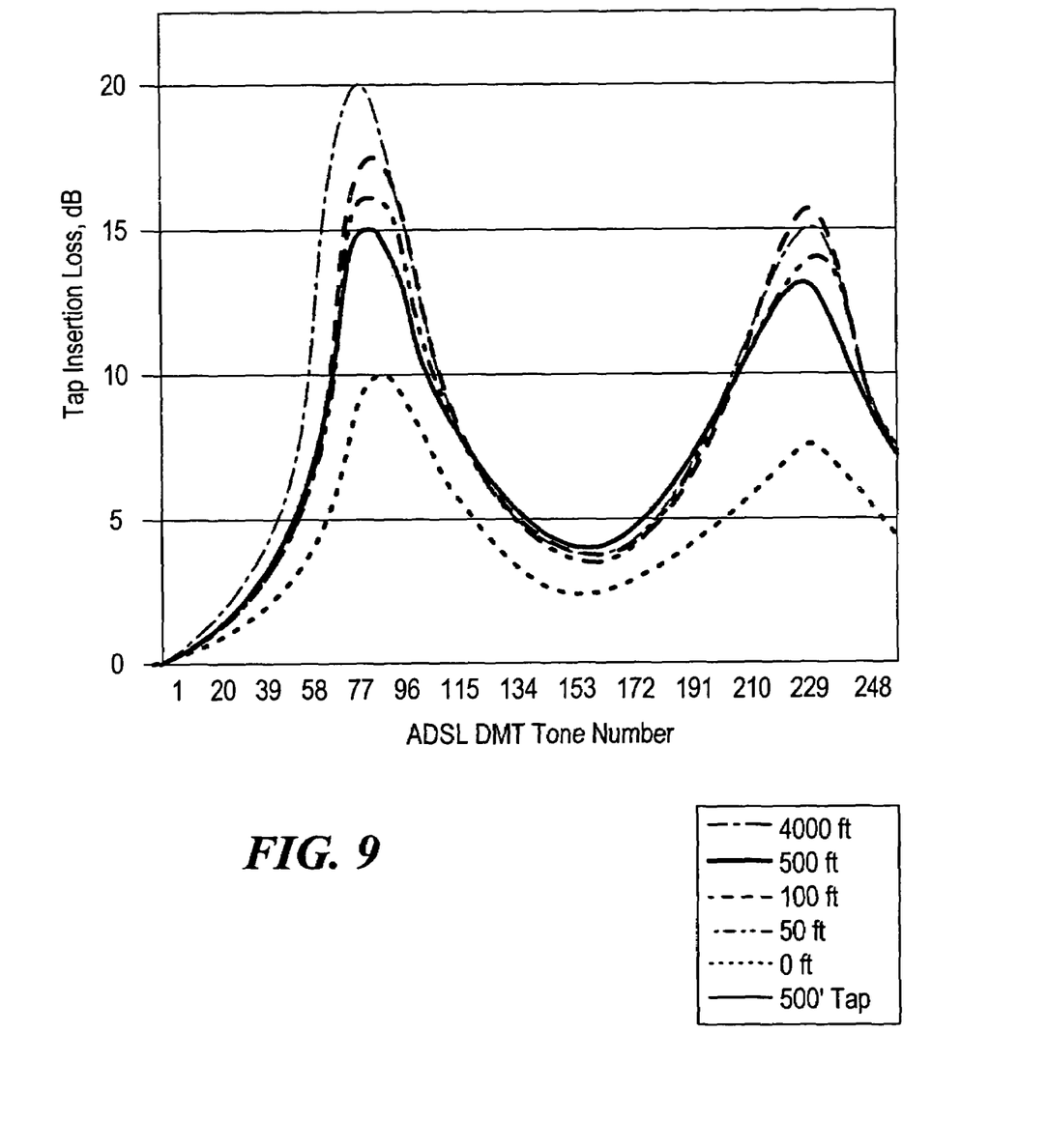

In another embodiment, the distance between taps can also be determined by examination of insertion loss. Shown in FIG. 9 is a graph that illustrates loss curves for a single 500' tap and loss curves for two 500' taps separated by 0 to 4000 feet. The insertion loss can be used to determine the proximity between two taps. When two taps are separated by a distance that is large compared to the length of the taps, the insertion loss of the taps is "additive" inasmuch as the net insertion loss is approximately the sum of the individual insertion losses due to the taps. But as the taps are positioned closer together the effect is no longer simply additive. For the example case of two identical length taps approximately 500' each and for the particular case of 26 gauge cable taps, the effect on the total insertion loss as the separation between the taps decreases is dramatic, amounting to about a 5 dB difference between the cases of large and small separation distances. The difference increases for taps of 24, 22 or 19 gauge. The distance to a tap can be determined by adding a second tap and based on the insertion loss increase determining the distance between taps. As an example, to locate a 500 ft tap, one may add a second 500' tap and note the increased insertion loss near the resonance point near DMT Tone 72. If the increased insertion loss is 4.7 dB, the tap is less than 50 ft away. Similarly, 5.6 dB indicates 50' separation, 7 dB for 100' separation, 8 dB for 500' separation, and 9.5 dB for 4000 separation.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of collecting and processing modem data, the method comprising:

during training of a broadband modem, sending a series of tones within a frequency transmission band of the broadband modem, the series of tones having a predetermined transmission power level;

receiving the transmitted series of tones at a receiving broadband modem;

receiving a measurement value of a power level for each of the received tones in the series of tones transmitted to the receiving broadband modem;

determining a transmission loss for each of the series of tones by comparing the predetermined transmission power level and the received measured power level;

performing a statistical match comparison between each of the received tone signals and a plurality of computer models of a transmission facility, each computer model representing one or more bridged taps coupled to the transmission facility;

determining a best fit between each of the received tone signals and at least one of the plurality of computer models; and communicating bridged tap information related to the computer model having the best fit that includes a probability that the bridged tap from the computer model represents a physical tan.

2. The method of claim 1, further comprising taking a network operations action based on the bridged tap information.

3. The method of claim 2, wherein the bridged tap information includes a probability that each bridged tap included in the computer model having the best fit represents a corresponding physical tap coupled to the transmission facility.

4. The method of claim 1, wherein the bridged tap information of the computer model having the best fit includes a number of bridged taps, a type of each bridged tap, a bridged tap length of each bridged tap, and a bridged tap position of each bridged tap.

5. The method of claim 4, wherein the bridged tap information further comprises an effect of the bridged taps on communications service, and a probability that the bridged tap information is accurate with respect to the transmission facility.

6. A method comprising:

during a training session of a broadband modem device, receiving a plurality of tones communicated over a transmission facility to the broadband modem device, the plurality of tones within a frequency reception band of the broadband modem, the plurality of tones having a predetermined transmission power level;

measuring a power level for each of the plurality of received tones;

determining a transmission loss for each of the plurality of tones by comparing the predetermined transmission power level and the measured power level for each of the plurality of tones;

performing statistical match comparisons between each of the plurality of received tones and a plurality of computer models, wherein each of the plurality of computer models represents electrical transmission properties of the transmission facility coupled to at least one bridged tap; and communicating a probability that a bridged tap of one of the computer models represents a physical tap.

7. The method of claim 6, further comprising determining a best fit between each of the plurality of received tones and one of the plurality of computer models based on the statistical match comparisons.

8. The method of claim 7, further comprising communicating bridged tap information related to the computer model having the best fit from the broadband modem device to a storage facility that is remote from the broadband modem device.

9. The method of claim 8, further comprising:

performing computer analysis of the bridged tap information; and providing user information via a user interface to a network management user, wherein the user information is based at least in part on the computer analysis;

wherein the storage facility comprises a computer workstation providing access to the user interface of the network management user.

10. The method of claim 9, wherein the computer workstation receives a File Transfer Protocol (FTP) file that includes the bridged tap information in response to making an FTP request via a distributed computer network.

11. The method of claim 7, further comprising communicating bridged tap information related to the computer model having the best fit, the bridged tap information including a probability that each bridged tap represents a corresponding physical tap coupled to the transmission facility.

12. The method of claim 6, wherein a first computer model of the plurality of computer models identifies a first bridged tap having a first tap length and a second computer model of the plurality of computer models identifies a second bridged tap having a second bridged tap length, and wherein the first bridged tap length is greater than 500 feet and the second bridged tap length is less than 500 feet.

13. The method of claim 12, further comprising removing a first physical tap from the transmission facility, wherein the first physical tap is represented by the first bridged tap identified by the first computer model.

14. The method of claim 6, wherein the broadband modem device is a Digital Subscriber Line (DSL) modem, and wherein each of the plurality of tones corresponds to a Discrete Multi Tone (DMT) center frequency according to a DSL standard.

15. A data communication system comprising:

a memory including logic, the logic comprising:

a data receiving module configured to capture data corresponding to a plurality of tones communicated during a modem training session over a transmission facility coupled to an input of a data communication modem, the plurality of tones within a frequency reception band of the data communication modem, each of the plurality of tones having a predetermined transmission power level;

a measurement module to capture measurement data related to a measured power level for each of the plurality of received tones;

an insertion loss routine to determine a transmission loss for each of the plurality of tones by comparing the predetermined transmission power level and the measurement data for each of the plurality of tones;

statistical matching logic configured to perform statistical match comparisons between the captured measurement data and a plurality of computer models, wherein each of the plurality of computer models corresponds to electrical transmission properties of a transmission facility that is coupled to at least one bridged tap; and a bridged tap analysis module to perform an analysis on one of the computer models determined to be a best fit match to the captured measurement data and to generate bridged tap data to be communicated to a user interface, wherein the bridged tap data includes a probability that the bridged tap of the one of the computer modules represents a physical tap.

16. The system of claim 15, wherein the bridged tap data comprises a number of bridged taps, bridged tap lengths, effect on service, and an estimate of accuracy of the computer model.

17. The system of claim 15, wherein the memory is embedded within a broadband data modem.

18. The system of claim 15, wherein the memory is within a computer workstation that is remote from a broadband data modem that receives the plurality of tones.

19. The system of claim 15, wherein the memory is within a computer workstation coupled to a central telephone office, the central telephone office including broadband communication equipment that supports the data communication modem.

20. A method comprising:

during a training session of the broadband modem device, receiving a plurality of tones communicated over a transmission facility to the broadband modem device, the plurality of tones within a frequency reception band of the broadband modem, the plurality of tones having a predetermined transmission power level;

measuring a power level for each of the plurality of received tones;

determining a transmission loss for each of the plurality of tones by comparing the predetermined transmission power level and the measured power level for each of the plurality of tones; and performing statistical comparisons between each of the plurality of received tones and a plurality of computer models, wherein each of the plurality of computer models represents electrical transmission properties of a transmission facility coupled to a bridged tap; and communicating a probability that a bridged tap of one of the plurality of computer models represents a physical bridged tap.

21. The method of claim 20, further comprising:

adding an additional bridged tap to at least one of the plurality of computer models, and based on an insertion loss increase, determining a distance between the additional bridged tap and the bridged tap.

22. The method of claim 20, further comprising:

selecting a best fit computer model from the plurality of computer models, based at least in part on the statistical comparisons;

determining a probability that a bridged tap identified by the best fit computer model represents a physical bridged tap on the transmission facility; and communicating the probability that the bridged tap identified by the best fit computer model represents the physical bridged tap on the transmission facility.

23. The method of claim 22, further comprising determining whether to remove the physical bridged tap, based at least in part on the probability.

* * * * *